(12) United States Patent
Bontjer et al.

(10) Patent No.: US 7,625,266 B2
(45) Date of Patent: Dec. 1, 2009

(54) METHOD FOR PHASED SEPARATION OF A SAUSAGE STRAND, SEPARATING ELEMENT AND ASSEMBLY OF SEPARATING ELEMENTS

(75) Inventors: Marcus Bernard Hubert Bontjer, Nuenen (NL); Kasper Willem Van Den Berg, Oss (NL); Jacob Jan Riemens, Oss (NL)

(73) Assignee: Stork Townsend, B.V., Oss (NL)

( * ) Notice: Subject to any disclaimer, the term of this patent is extended or adjusted under 35 U.S.C. 154(b) by 0 days.

(21) Appl. No.: 10/581,785

(22) PCT Filed: Dec. 10, 2004

(86) PCT No.: PCT/NL2004/000863

§ 371 (c)(1),
(2), (4) Date: Apr. 12, 2007

(87) PCT Pub. No.: WO2005/055730

PCT Pub. Date: Jun. 23, 2005

(65) Prior Publication Data

US 2007/0281597 A1    Dec. 6, 2007

(30) Foreign Application Priority Data

Dec. 12, 2003    (NL)    .................................... 1025005

(51) Int. Cl.
*A22C 11/00* (2006.01)
(52) U.S. Cl. .............................. 452/49; 452/48; 452/51
(58) Field of Classification Search .................. 452/30, 452/31, 32, 37, 46, 47, 48, 49, 50, 51
See application file for complete search history.

(56) References Cited

U.S. PATENT DOCUMENTS

| 4,214,492 | A | * | 7/1980 | Hoffman | ........................ 83/24 |
| 4,418,447 | A |   | 12/1983 | Ziolko |   |
| 4,463,641 | A | * | 8/1984 | Sato | ........................... 83/175 |
| 5,145,450 | A | * | 9/1992 | Staudenrausch et al. | ....... 452/47 |
| 5,173,075 | A | * | 12/1992 | Wadell | ........................ 452/46 |
| 5,421,137 | A | * | 6/1995 | Stimpfl | ........................ 53/435 |
| 6,045,445 | A | * | 4/2000 | Hummel et al. | ................ 452/46 |
| 6,080,054 | A | * | 6/2000 | Muller et al. | .................. 452/49 |

FOREIGN PATENT DOCUMENTS

EP    0 503 720    9/1992

\* cited by examiner

*Primary Examiner*—David J Parsley

(57) ABSTRACT

A method for phased separation of a sausage strand, a separating element for phased separation of a sausage strand, and an assembly of a plurality of such separating elements. In the production of sausages it frequently occurs that a sausage strand must be divided into smaller segments, and the result of this division is achieved in controlled manner by the present invention.

15 Claims, 4 Drawing Sheets

METHOD FOR PHASED SEPARATION OF A SAUSAGE STRAND, SEPARATING ELEMENT AND ASSEMBLY OF SEPARATING ELEMENTS

BACKGROUND OF THE INVENTION

The invention relates to a method for phased separation of a sausage strand. The invention also relates to a separating element for phased separation of a sausage strand and to an assembly of a plurality of such separating elements.

In the production of sausages it frequently occurs that a sausage strand (manufactured for instance by means of an extrusion process from dough or a dough of vegetable material) must be divided into smaller segments (individual sausages). Such a sausage strand can be, although it does not necessarily have to be, provided with a casing, which can for instance also be manufactured by means of an extrusion process. For the division of the sausage strand into individual sausages frequent use is made of a wheel with a plurality of separating elements. A drawback of such a wheel is that the quality of the separated sausages is not always satisfactory. In the European patent 1 263 293 a method and apparatus is described for phased separation of a sausage strand. Use is made herein of two co-acting wheels between which the sausage strand for separating is first pressed together at the locations where it will later actually be separated. At the locations where it is pressed together, the sausage strand is then separated by means of the separating elements. A drawback of the art described in the European patent is that when the sausage strand is pressed together between two co-acting wheels the separated sausages are still not of optimal quality, and that the flexibility of such an apparatus is limited (different wheels have to be mounted for different sausage lengths). This lesser quality relates in particular to sausage ends which are not round (for instance "pillow-shaped").

SUMMARY OF THE INVENTION

The object of the present invention is to provide improved means and an improved method with which a sausage strand can be separated in phases in simple manner such that the quality of the separation is improved compared to the prior art.

The invention provides for this purpose a method for phased separation of a sausage strand, comprising the processing steps of: A) supplying a sausage strand, B) positioning the sausage strand relative to a separating element, C) moving at least two pressing members forming part of the separating element toward each other with a first movement such that the sausage strand is constricted locally, D) moving the pressing members apart, and E) moving at least two cutting members forming part of the same separating element toward each other such that the sausage strand is separated at the position of the sausage strand constricted locally during processing step C). The sausage strand is preferably supplied at a constant speed and along a part of the transport path of the sausage strand the separating element is advanced parallel to the sausage strand. The different processing steps of phased separation of a sausage strand are thus performed with a single separating element. This has diverse advantages compared to the prior art method. Constriction of the sausage strand can thus be continued for a desired period. For a good local displacement of the sausage dough, the dough has to be pressed aside for a minimum period. Only if this displacement is continued for a sufficiently long period will the dough "set" in the desired state. Other than in the prior art, it is possible using the method according to the invention to continue the displacement for as long as desired. The time period required for displacement will vary in practice with different sausage types (depending on the quality of sausage dough, the dimensions of the sausage strand and the intended end result). In addition, the speed at which the pressing members move toward each other can also be adjusted, further increasing the control over the separating process. Another significant advantage is that the displacement of the dough and the actual separation are carried out by a single separating element; repositioning of cutting means after performing the local constriction of the sausage strand is unnecessary. It is not therefore possible to make any errors hereby during processing of the sausage strand. Another important advantage is that the orientation and the form of the local constriction to be made can be freely chosen. The form and orientation of the pressing members can after all be varied as desired; nor is this option available in the prior art. Particularly favourable results are thus found to be achieved when the constriction of the sausage strand realized during processing step C) has a form of elongate cross-section with a longitudinal axis of the constriction lying substantially perpendicular to the cutting direction of the cutting members. It is noted by way of elucidation that "moving toward each other" of the pressing members and the cutting members is not necessarily understood to mean the movement of both members. This is a displacement of the members relative to each other which is likewise realized if one of the members is stationary and the other member is displaced relative to the stationary member. Such a displacement of only one member also falls within the definition of "moving toward each other" of the members.

In yet another preferred application of the method, the sausage strand is locally constricted by at least partially displacing sausage dough locally from a casing. The casing (also referred to as "skin") is usually arranged to protect and shape the sausage dough. The presence of a casing simplifies the process of displacing the sausage dough; the casing increases control over the movement of the sausage dough. The sausage dough can here be displaced such that casing portions of the sausage strand on opposite sides can be brought into contact with each other during constricting of the sausage strand as according to processing step C) . For an effective local displacement the ,pressing members can be provided with co-acting contact surfaces between which the sausage strand is engaged. The choice and orientation of these contact surfaces can be freely determined. For further simplification and in order to obtain a "hard" synchronization of the operation of the pressing members and the cutting members of a separating element, in a preferred variant these are operated by a common drive. The pressing members can be displaceable in parallel planes or they can be displaceable in the same plane. In this latter case it is possible to displace the dough completely out of a casing along a certain length, for instance over a length of about 10 mm, or a length smaller than 15 mm.

The invention also provides a separating element for phased separation of a sausage strand, comprising: at least two pressing members, which pressing members are relatively displaceable between a release position and an operative position in which the pressing members are placed closer together than in the release position, and at least two cutting members assembled with the pressing members, which cutting members are relatively displaceable between a release position and a cutting position. "Release position" is understood to mean the position in which the pressing members leave a space between them such that a sausage strand can be placed unimpeded between the pressing members or the cutting members. In the operative position the pressing members exert a pressure on the sausage strand such that the sausage strand is constricted at the position where it is engaged. The cutting position is understood to mean the situation where the cutting members, preferably provided with a cutting edge, are located a short distance from each other such that they together perform a cutting action on the sausage strand. This usually means in practice that the cutting members at least partially overlap each other. It is of great importance that the pressing members and the cutting members are assembled in order to thus form a single separating element with which the whole process of phased separation can be carried out. The integration of the pressing members and the cutting members into a single unit results in the advantages as already described above in respect of the method according to the present invention.

In a preferred variant, the separating element also comprises drive means connected to the pressing members and cutting members. These can for instance be formed by an electric drive, pneumatic drive means, hydraulic drive means, cam followers connected to the separating element which are adapted to co-act with cam guides (such as discs or tracks) and so on. It will be apparent that it is advantageous to couple the pressing members and the cutting members to common drive means. Because of the coupling, preferably a rigid coupling of "paired" pressing members and cutting members, it is structurally extremely simple to make use of a single drive for a separating element.

An advantageous embodiment variant is characterized in that the contact side of the pressing member of a rigidly coupled assembly of pressing member and cutting member is directed toward the contact side of the cutting member coupled thereto. This will be further elucidated below with reference to an exemplary embodiment of the separating element according to the invention shown in the figures. For co-displacement of the separating element with the sausage strand it is desirable that the separating element be supported by a displaceable holder.

The invention moreover provides an assembly of a plurality of separating elements as described above, wherein the separating elements are placed in line. A sausage strand must generally be separated at a large number of positions (with a fixed and substantially identical mutual spacing). In addition, the production of a sausage strand is usually a continuous process. In order to now provide sufficient separating capacity, it is advantageous to operate a plurality of separating elements successively in the line of the sausage strand. The separating elements can thus be placed on the periphery of a rotatable wheel. An alternative is to assemble the separating elements on an endless conveyor. Such systems (wheel and endless conveyor) make it possible to also perform the phased separation in continuous manner. It is noted that it is also possible to place a number of lines with successive separating elements parallel and adjacently of each other, so that a plurality of sausage strands can be separated simultaneously.

For a simple and inexpensive driving thereof, the assembled separating elements are provided in a preferred embodiment with cam followers which co-act with a cam track likewise forming part of the assembly, which cam followers and cam track are relatively displaceable.

DETAILED DESCRIPTION OF A PREFERRED EMBODIMENT OF THE INVENTION

Figure 1A:
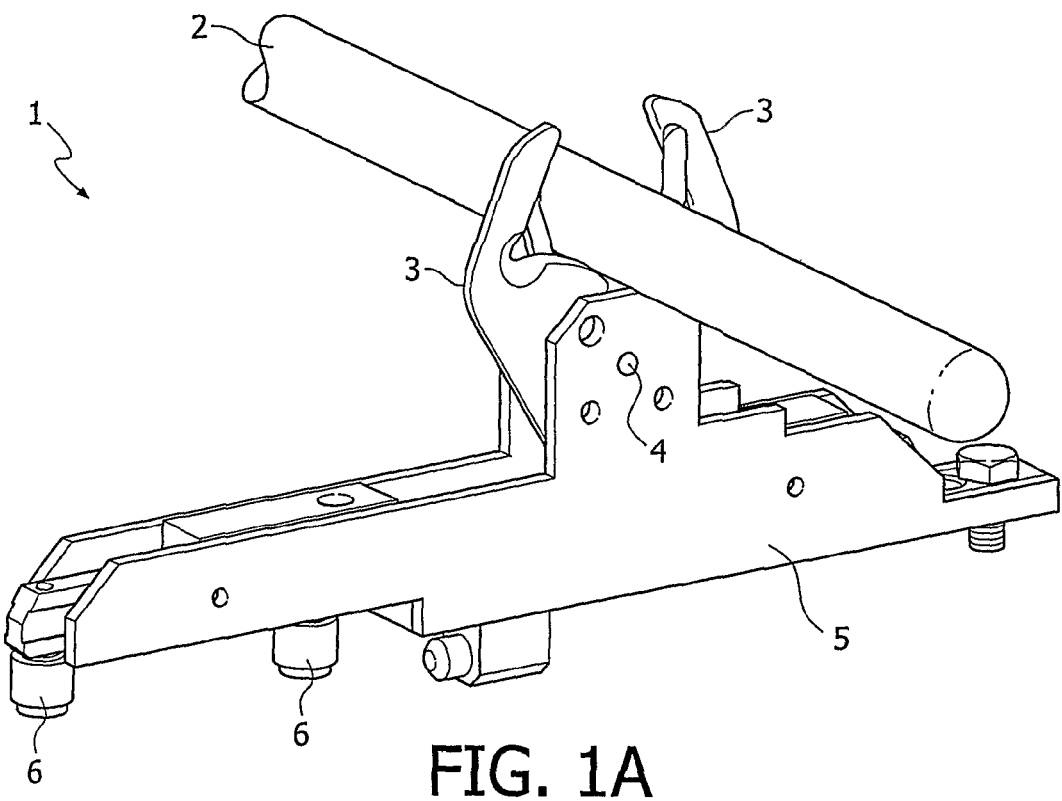
FIG. 1A shows a perspective view of a separating element according to the invention before commencement of a phased separating operation.
Figure 1B:
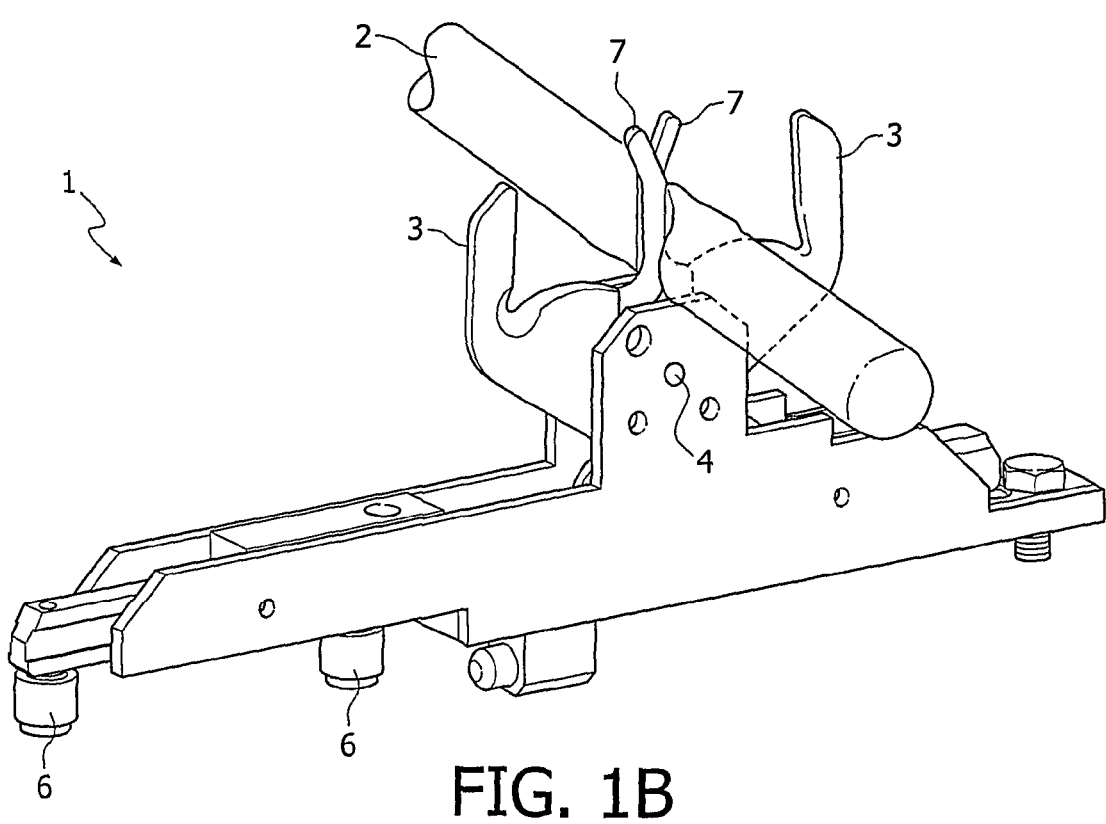
FIG. 1B is a perspective view of the separating element shown in FIG. 1A during a first phase of the separating operation.
Figure 1C:
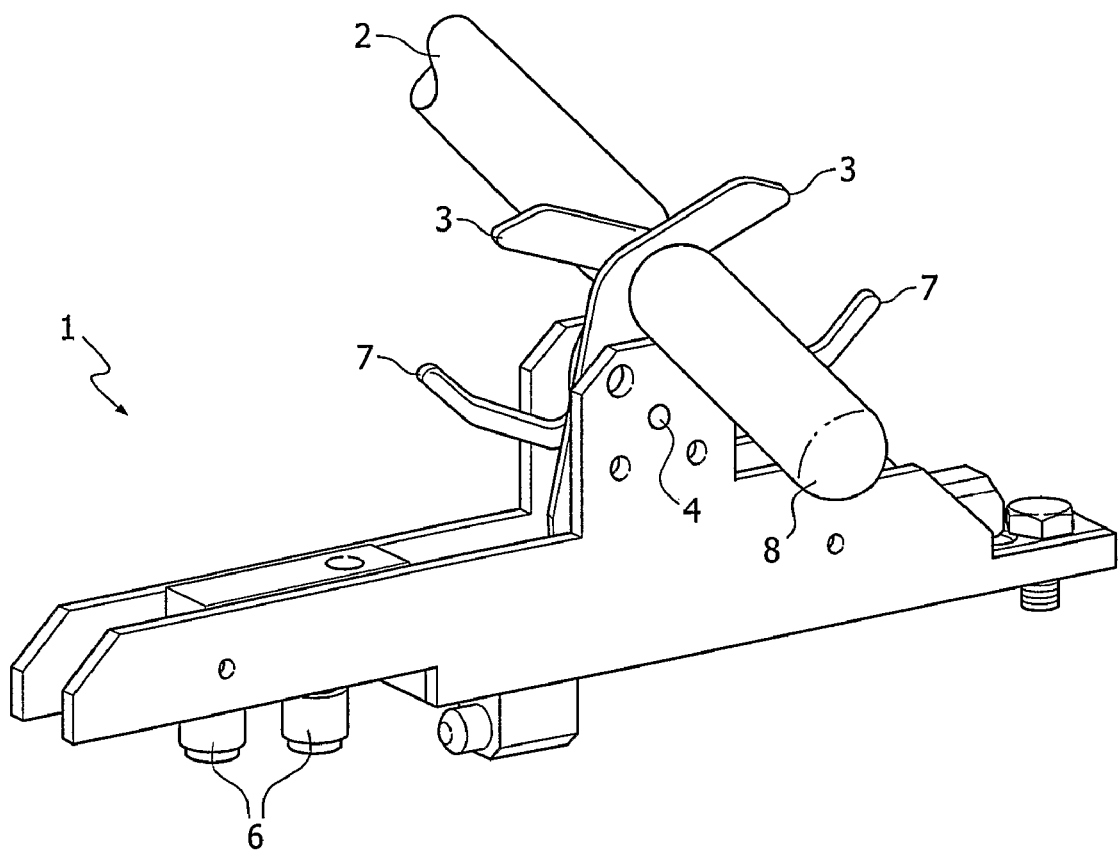
FIG. 1C is a perspective view of the separating element shown in FIGS. 1A and 1B during a second phase of the separating operation.
Figure 2A:
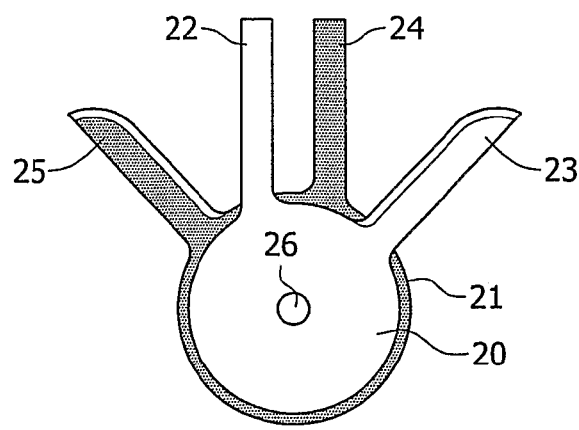
FIG. 2A is a schematic side view of a separating element according to the invention during a first phase of the separating operation.
Figure 2B:
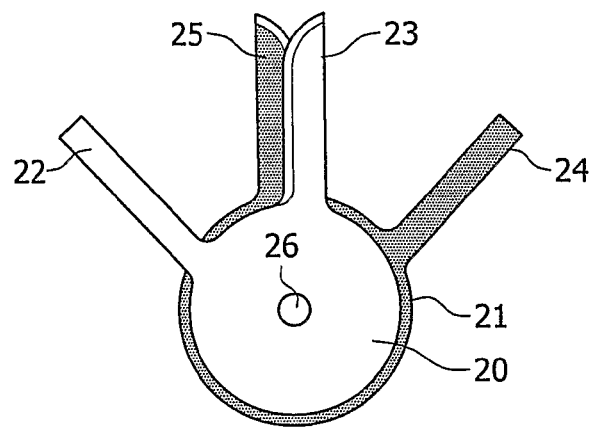
FIG. 2B is a schematic side view of the separating element shown in FIG. 2A during a second phase of the separating operation.

FIG. 1A shows a separating element 1 according to the invention which engages round an as yet unprocessed sausage strand 2. For this purpose the cutting members 3 (and the pressing members not shown in this figure) are moved so far apart that they leave sufficient space clear for the passage of sausage strand 2. Cutting members 3 are placed in a holder 5 for pivoting about a shaft 4. Also shown are cam followers 6 which protrude under holder 5 and which are coupled to cutting members 3 and the pressing members for displacement thereof. A first phase of the method for separating the sausage strand 2 is shown in FIG. 1B. Cutting members 3 are pivoted further apart by displacing the cam followers 6. Hereby becoming visible are pressing members 7 which engage on, and locally constrict, the sausage strand 2. It is noted that cutting members 3 are each rigidly coupled in each case to the pressing member 7 situated on the opposite side of sausage strand 2. This will be further elucidated with reference to FIGS. 2A and 2B. FIG. 1C shows the actual separation of an individual sausage 8 from sausage strand 2. For this purpose the pressing members are moved apart (relative to the position as shown in FIG. 1B) and cutting members 3 are moved simultaneously toward each other in partially overlapping manner. FIG. 2A shows schematically two assembled pairs 20, 21 of respectively pressing member 22 and cutting member 23, and pressing member 24 and cutting member 25. Both pairs 20, 21 are rotatable about a shaft 26. FIG. 2A shows the pairs 20, 21 in a situation where pressing members 22, 24 co-act. FIG. 2B shows the same pairs 20, 21 of respectively pressing member 22 and cutting member 23, and pressing member 24 and cutting member 25, though now in a situation where cutting members 23, 25 co-act.

Figure 3A:
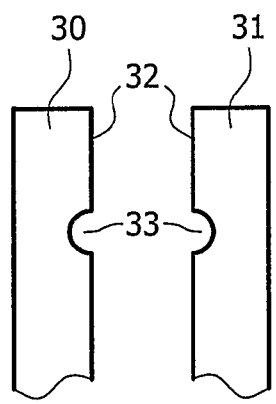
FIG. 3A shows a schematic side view of a pair of co-acting pressing members.
Figure 3B:
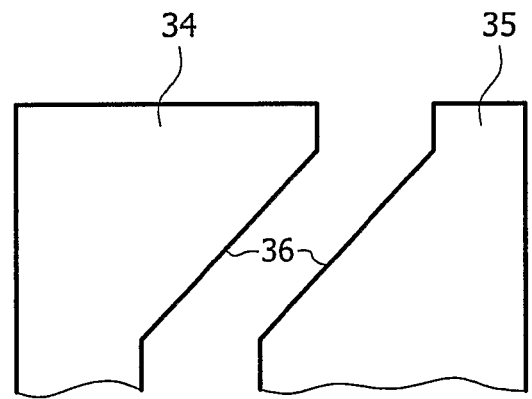
FIG. 3B shows a schematic side view of an alternative embodiment variant of a pair of co-acting pressing members.

FIG. 3A shows a possible design of two pressing members 30, 31. Recesses 33 are herein provided on the contact sides 32 of pressing members 30, 31 in order to thus define the form the constriction of a sausage strand will take. FIG. 3B shows two other pressing members 34, 35, the contact sides 36 of which have an orientation different from contact sides 32 of pressing members 30, 31 shown in FIG. 3A. The position of a constriction of a sausage strand created by means of pressing members 34, 35 will also have a determined orientation.

Figure 4:
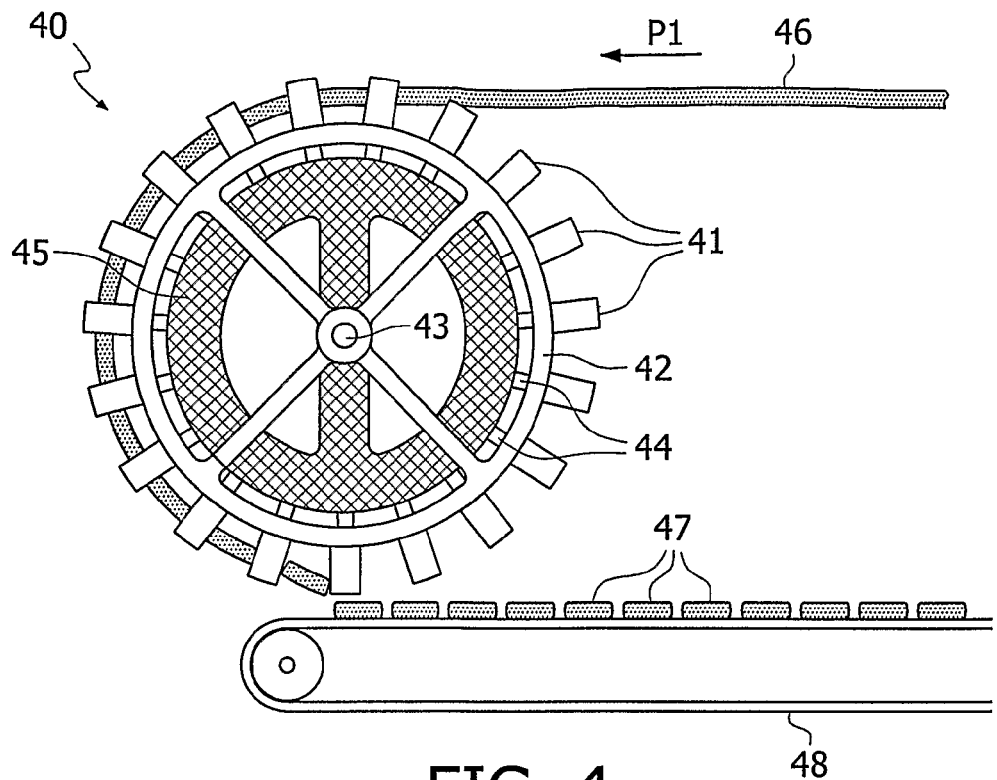
FIG. 4 is a side view of an assembly of a plurality of separating elements according to the invention.

FIG. 4 shows an assembly 41 of a plurality of separating elements 42 in the form of a wheel 42. This wheel 42 is rotatable about a shaft 43. Through rotation of wheel 43 cam followers 44 of the individual separating elements 42 move over a cam guide 45 in stationary position. A continuous sausage strand 46 is fed as according to arrow P1 to wheel 42, whereafter the individual separating elements 42, actuated by cam guide 45, will perform the phased separating operation as illustrated in FIGS. 1A-1C. After passing through the phased separating operation, separated sausages 47 are discharged by a belt conveyor 48 as according to arrow P2.

Figure 5A:
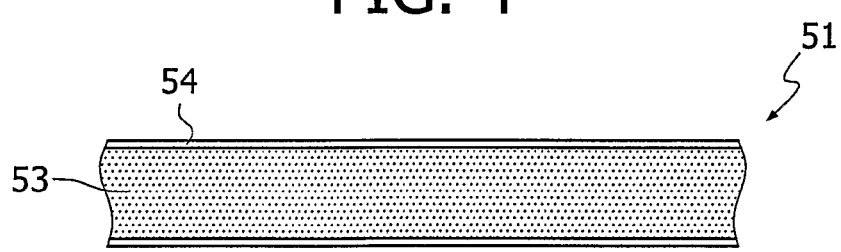
FIG. 5A shows a cross-section through a part of an unprocessed sausage strand.
Figure 5B:
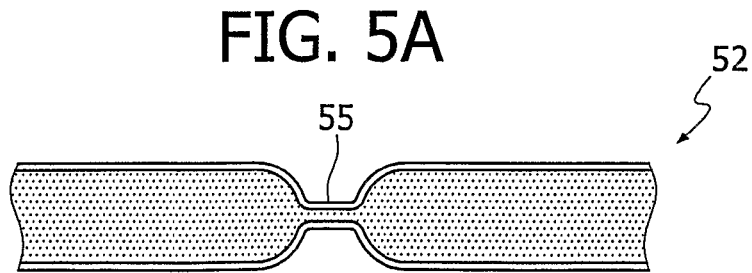
FIG. 5B shows a cross-section through a part of a partially processed sausage strand.
Figure 5C:
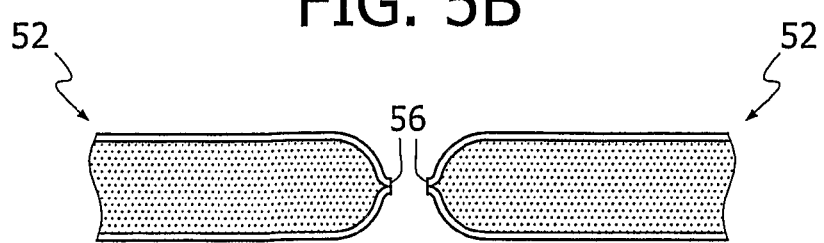
FIG. 5C shows a cross-section through a sausage strand divided into individual sausages.

FIGS. 5A-5C finally show sausage strand 51 and the separated sausages 52 in successive phases of processing. Sausage strand 51 as shown in FIG. 5A has a centre consisting of dough 53 (for instance a dough formed by animal and/or vegetable material) which is enclosed by a casing 54. After a first processing of sausage strand 52 by means of pressing members (not shown in FIG. 5B), a local constriction 55 is created in sausage strand 51. After completing the separation, there remains of the sausage strand 51 only the individual sausages 52, see FIG. 5C. Particularly the finishing and closure (encasing of the sausage dough 53 by casing 54) of the outer ends 56 of sausages 52 can be readily controlled as a result of applying the method and/or device according to the present invention.

What is claimed is:

1. Method for phased separation of a sausage strand, comprising the processing steps of:
    A) supplying a sausage strand,
    B) positioning the sausage strand relative to a separating element,
    C) moving at least two pressing members forming part of the separating element toward each other with a first movement such that the sausage strand is constricted locally,
    D) moving the pressing members with a second movement that is directed in opposite direction of the direction of the first movement apart from each other and back from the constricted sausage strand, and
    E) moving at least two cutting members forming part of the same separating element toward each other such that the sausage strand is separated at the position of the sausage strand constricted locally during processing step C).

2. Method as claimed in claim 1, characterized in that the sausage strand is supplied at a constant speed and that along a part of the transport path of the sausage strand the separating element is advanced parallel to the sausage strand.

3. Method as claimed in claim 1, characterized in that the sausage strand is locally constricted by at least partially displacing sausage dough locally from a casing enclosing the sausage dough.

4. Method as claimed in claim 3, characterized in that the sausage dough is displaced such that casing parts of the sausage strand on opposite sides are brought into contact with each other during constricting of the sausage strand as according to processing step C).

5. Method as claimed in claim 1, characterized in that the pressing members are provided with co-acting contact surfaces between which the sausage strand is engaged.

6. Method as claimed in claim 1, characterized in that the pressing members and the cutting members of a separating element are operated by a common drive.

7. Separating element for phased separation of a sausage strand, comprising:
    at least two pressing members, which pressing members are relatively displaceable between a release position and an operative position in which the pressing members are placed closer together than in the release position, and
    at least two cutting members assembled with the pressing members, which cutting members are relatively displaceable between a release position and a cutting position, characterized in that each paired cutting member and pressing member are provided of two individual arms located on opposite sides of the sausage strand such that the sausage strand is to be separated as the pressing members are moved back from the sausage strand the cutting members paired with the moving apart pressing members are moved toward each other each from the opposite side of the pressing members they are coupled with.

8. Separating element as claimed in claim 7, characterized in that the separating element also comprises drive means connected to the pressing members and cutting members.

9. Separating element as claimed in claim 8, characterized in that the pressing members and cutting members are coupled to common drive means.

10. Separating element as claimed in claim 7, characterized in that the contact side of the pressing member of a rigidly coupled pair of pressing member and cutting member is directed toward the contact side of the cutting member coupled thereto.

11. Separating element as claimed in claim 7, characterized in that the separating element is supported by a displaceable holder.

12. Assembly of a plurality of separating elements as claimed in claim 7 characterized in that the separating elements are placed in line.

13. Assembly of separating elements as claimed in claim 12, characterized in that the mutual distance between successive separating elements is constant.

14. Assembly of separating elements as claimed in claim 12, characterized in that the separating elements are placed on the periphery of a rotatable wheel.

15. Assembly of separating elements as claimed in claim 12, characterized in that the separating elements are provided with cam followers which co-act with a cam track likewise forming part of the assembly, which cam followers and cam track are relatively displaceable.

* * * * *